Heinrich Fuhring
INVENTOR.

Heinrich Fuhring
INVENTOR.

BY Ross & Mestern

Feb. 21, 1967 H. FUHRING 3,304,565
CLEANING INSTALLATIONS FOR VEHICLES
Filed May 17, 1965 5 Sheets-Sheet 5
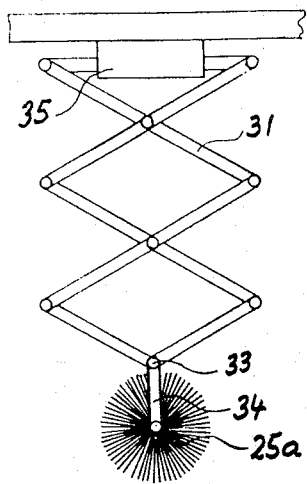
FIG. 8
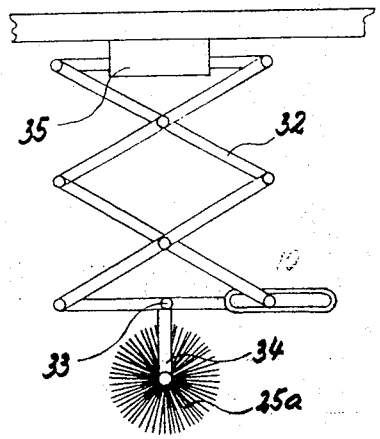
FIG. 9
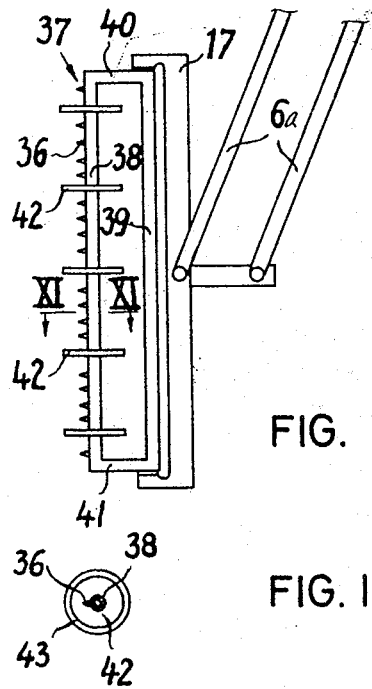
FIG. 10
FIG. 11
Heinrich Fuhring
INVENTOR.
BY Ross & Mestern

United States Patent Office 3,304,565
Patented Feb. 21, 1967

3,304,565
CLEANING INSTALLATIONS FOR VEHICLES
Heinrich Fuhring, Augsburg, Germany, assignor to Böwe, Böhler & Weber K.G., Augsburg, Germany
Filed May 17, 1965, Ser. No. 456,232
Claims priority, application Germany, May 16, 1964,
B 76,804
7 Claims. (Cl. 15—21)

The invention concerns a washing installation for vehicles, more especially passenger cars, but also for trucks, buses, rail vehicles and the like. Such an installation has rotary brushes which are displaceable relatively to a vehicle, the installation or the vehicle or both being displaceable towards each other.

In this type of washing installation it is known to mount a vertical and a horizontal brush in a chassis and for the latter to be displaced along a closed track about the vehicle. The brushes are mounted on long lever arms and are resiliently urged against the surface of the vehicle. The result is that the chassis can be moved only in one direction around the vehicle and consequently the washing effect is poor, because numerous hollows e.g. in the tail fins, are not accessible to the bristles but are frequently skipped.

It is also known to use a more elaborate brush arrangement wherein vertical and horizontal brushes are mounted in rocker bars on a portable bogie passing in a U-like manner about the vehicle, the brushes being urged resiliently against the vehicle surfaces. This washing arrangement, despite its considerable structure and cost is unable to wash the front and rear surfaces of the vehicle sufficiently, because brushes arranged in pivotal arms have a different behavior, from a washing point of view, with each size of vehicle and do not reach all surface regions. Moreover the application pressure of the brushes varies considerably depending upon the deflection of the rocker arms.

It is an object of the invention to make the brush arrangement independent of the size of vehicle and to construct it in such a manner that the individual vertical brushes reach all vertical and substantially vertical surfaces and with a uniform pressure to permit adequate washing to be carried out.

A further object of the invention is to provide an installation which is highly effective but low in cost. The invention proposes a construction wherein the brushes are not supported resiliently or by their own weight against the vehicle but positively positioned by the outline of the vehicle.

According to the present invention each individual brush is mounted on a parallelogrammatic guide system and adapted to be pivotal about at least two intersecting axes.

The parallelogrammatic guide system permits the brushes to be adjusted to varying vehicle sizes; moreover it also utilizes elevating means in order to reach the end faces of the vehicle.

The invention will now be described further, by way of example with reference to the accompanying drawings, in which:

FIG. 8 is a side fragmentary side view of a washing installation having a vertically displaceable horizontal brush mounted on a lazy tongs system;

FIG. 9 is a side view similar to FIG. 8, of a modified support with the brush in a different position.

FIG. 10 is a detail in elevation of a spraying device with spacers mounted on a system of parallelogrammatic guide rods; and FIG. 11 is a section on the line XI—XI of the spraying device shown in FIG. 10.

Figure 1:
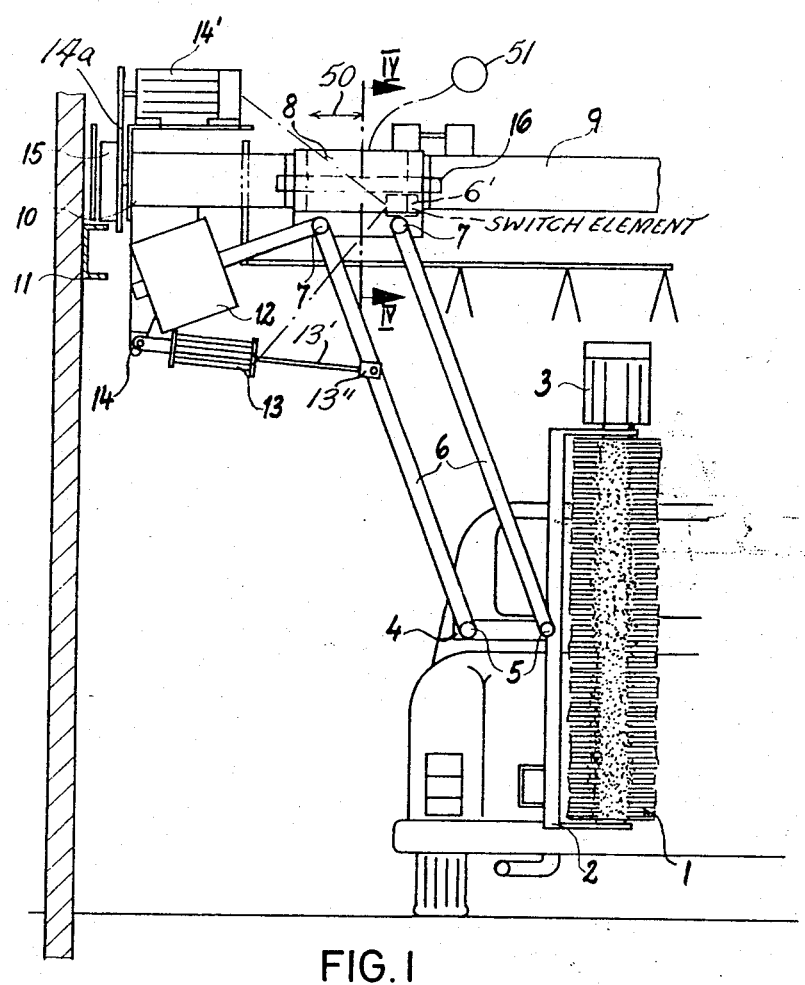
FIG. 1 is a partial end elevation of a washing installation having a vertically mounted brush.
Figure 2:
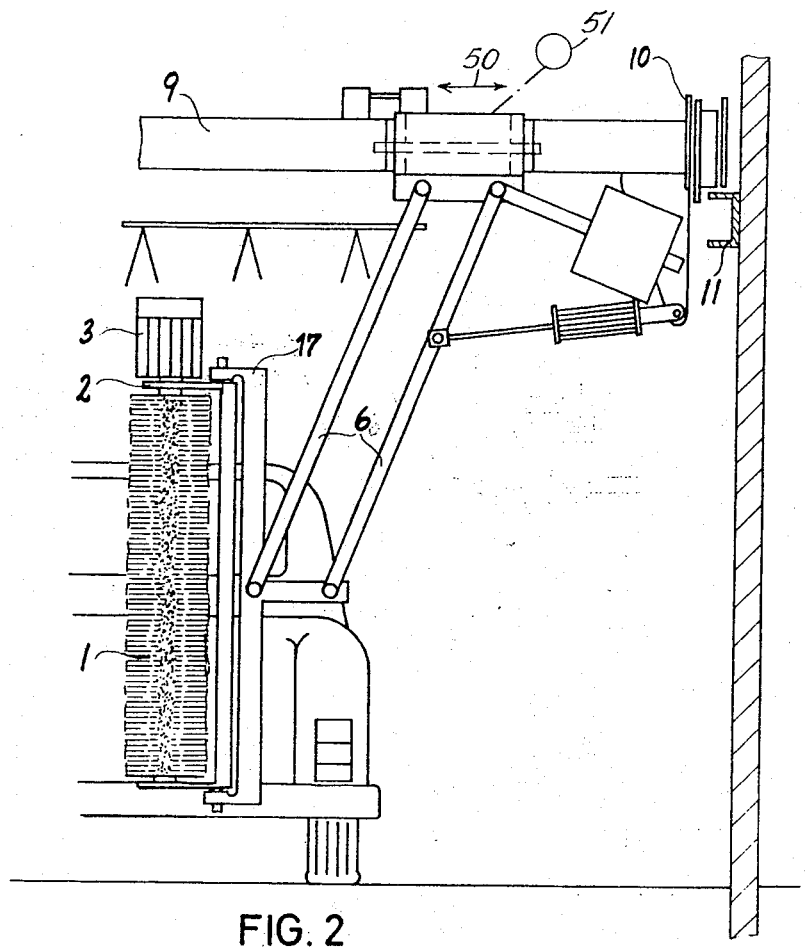
FIG. 2 is a similar end elevation of an alternative form of washing installation.

In the embodiment shown in FIGURE 1 a vertically arranged brush 1 is mounted in a U-shaped yoke 2, which extends around the brush 1; a prime mover 3, e.g. an electric motor, for rotation of the brush, is mounted on this yoke 2. The yoke 2 has a rigid cantilever arm 4 to which two guide rods 6 of a parallelogrammatic guide-rod assembly are journalled at 5. Upper bearings or pivots 7 of the guide rods 6 are disposed on a bearing hub or sleeve 8 which is preferably mounted on a traverse arrangement 9 connecting two chassis parts 10 which, for example, are guided on support rails 11 arranged on the wall of a washing chamber.

The guide rod mechanism 6 is moreover connected with a counter balance 12 which prevents or reduces the pendulum movement of the brushes. A drive, preferably a pneumatic cylinder 13, is pivotally mounted on the chassis 10 at 14 and has its connecting rod 13' articulated at 13" to the parallelogrammatic linkage 6.

The effect of the arrangement shown in FIG. 1 is that the drive 13 permits the brush 1 to be moved in the direction of, or forwardly or rearwardly of, the vehicle. By horizontally swinging the parallelogrammatic guide-rod assembly 6 about the bearings 7, the brush 1 is reciprocated along the radiator and rear portion of the vehicle and thereby carries out a perfectly adequate washing effect. The brush may be sprayed as usual with water or any other washing liquid.

The same drive 13 also causes the brush 1 to be moved over the entire height of the lateral surface of the vehicle; whereupon a feed motor 14' on the chassis 10 shifts the chassis longitudinally along the rails 11 and the vehicle by means of driven wheels 15; the motor 14' is coupled with the latter by a transmission 14a'.

Any irregularities in the side surface of the vehicle may be compensated by means of the counter balance 12 and the dead weight of the brush the drive 13 being vented to prevent it from impeding the contour-following effect.

To obtain automatic control of the brush 1 in dependence upon the outlines of the vehicle, the brush 1 is pivotal at least about intersecting axes. One axis is provided by the bearings 7 whereas the other axis is formed by the pivotability of the bearing sleeve 8 about a horizontal axis 16 (FIG. 1).

In any case, due to the pivotability of the brush a relative movement is provided which may be used for switching the drive on or off, in that switching elements 6' and the like may be provided in the pivoting region of the brush.

Figure 3:
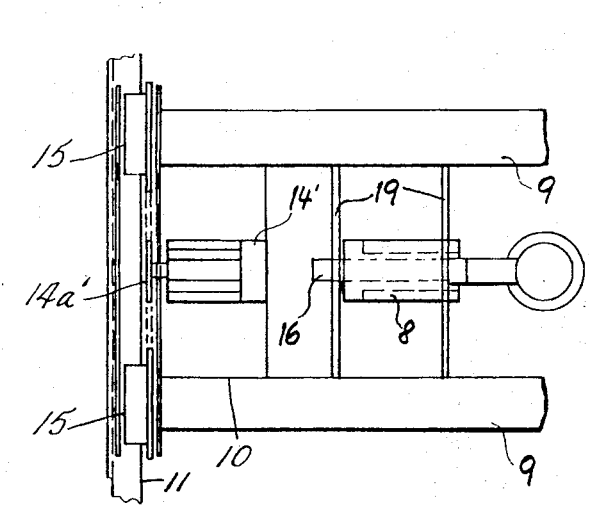
FIG. 3 is a plan view of the system of FIG. 1.

In the arrangement shown in FIG. 3 the chassis comprises two traverses 9 extending parallel to one another, which are adapted to receive the prime mover 14' and on which the parallelogrammatic linkage 6 is journalled for swinging movement about the horizontal axes defined by shaft 16.

Figure 4:
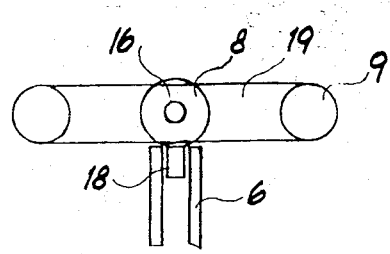
FIG. 4 is a diagrammatic section on the line IV—IV through the chassis or carriage shown in FIG. 1.

FIG. 4 shows the guide rod arrangement in the region of the bearing 8 which has an extension 18 for an articulated arrangement of the guide rods 6. The bearing 8 is pivotal about the bolt a shaft 16 spanning connecting webs 19 of the traverse 9.

Figure 5:
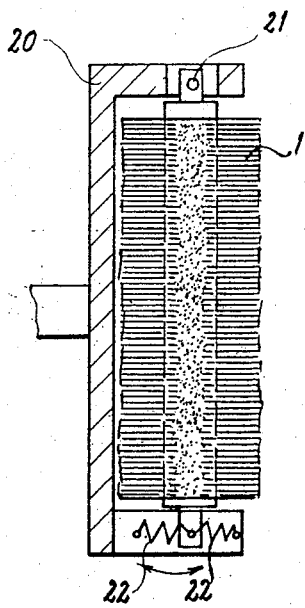
FIG. 5 is a longitudinal section through a brush mounting.

FIG. 5 shows a brush mounted so as to be adapted to clean the inclined surfaces of a vehicle. The brush 1 is mounted in an upper yoke limb 20 on a pin 21, whilst the lower brush part is stabilized by springs 22. When bearing against inclined surfaces the brush 1 is permitted automatically to assume a corresponding inclined position by swiveling about the pin 21 against the centering action of springs 22.

Figure 6:
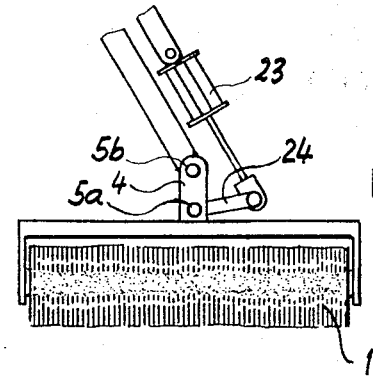
FIG. 6 is a side view of a guide-rod construction for shifting the brushes into the horizontal position.

FIG. 6 shows how the vertical brush 1 can be utilized for washing the vehicle roof. A lifting device 23 (e.g. a fluid-responsive cylinder as illustrated), inserted in one guide rod 6, swings via straps 24 a pivot point 5a below a hinge point 5b and thereby moves the brush 1 into a horizontal position. By this means it is first possible for the brush 1 to be disposed horizontally on the roof of the vehicle and displace it longitudinally along the vehicle to a region, for example, beyond the radiator. Then the brush 1 is swung into the vertical position and half the lateral surface of the vehicle is washed. A trailing second brush is also placed on the vehicle roof and moves in the direction of the rear of the vehicle whereupon, on swing horizontally into the vertical position the other half surface of the vehicle is treated. Naturally in this case it is necessary for each brush 1 to have its own chassis.

Figure 7:
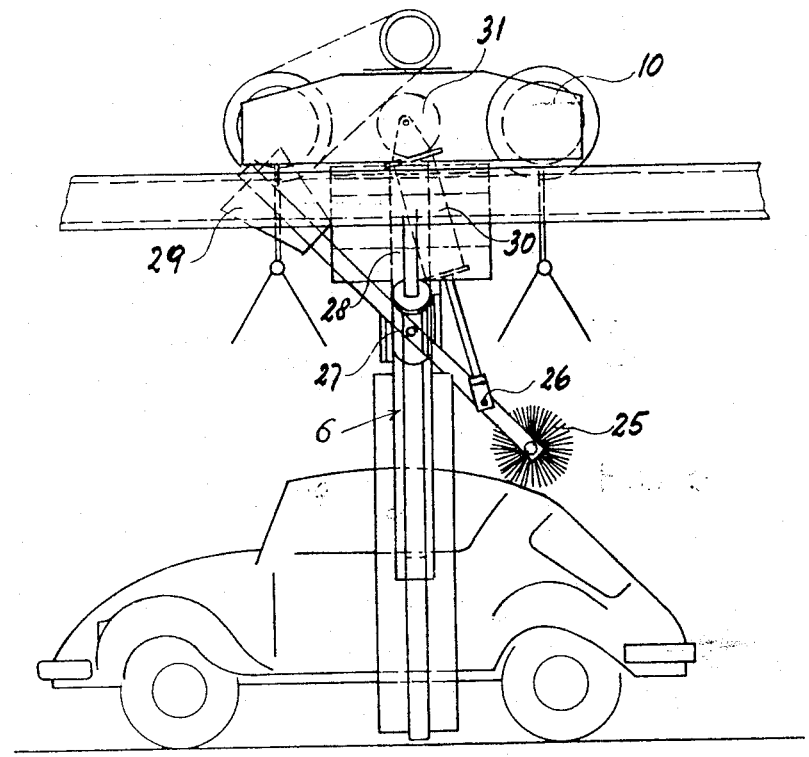
FIG. 7 is a side view of a washing installation having a vertically mounted brush roller and a brush mounted horizontally adapted to be pivoted about a horizontal axis.

FIG. 7 shows a vertical brush roller which is mounted on a parallelogrammatic guide rod assembly 6 and adapted to be displaceable about two intersecting axes, as described with reference to FIG. 1, and a horizontal brush roller 25 which is mounted on a guide arm 26 so as to be vertically reciprocable about a horizontal axis 27. The pivot point of the axis 27 is disposed on a column 28 which is connected to the chassis 10. A counter balance 29 is provided on the opposite end of the guide arm 26 which reduces or prevents automatic swinging of the roller 25.

A pneumatic cylinder 30, which is mounted on the vertical column 28 at 31, acts upon the guide arm 26.

The effect of the arrangement shown in FIG. 7 is in that the horizontal brush roller 25 may be forcibly adjusted into certain position by means of the pneumatic cylinder; and moreover, when displacing the chassis 10 in the longitudinal direction of the vehicle to be washed, the brush roller 25 is guided over the surface of the vehicle and irregularities or conours thereof are automatically compensated by the up-and-down movement of the brush 25, the drive 30 however being vented to prevent it from having a stopping effect.

FIGS. 8 and 9 illustrate the arrangement and vertical displacement of a horizontal brush 25a by means of a lazy tongs 31 or 32. In these embodiments the horizontal brush 25a is retained by yokes or arms 34 journalled to a lower end 33 of the lazy tongs 31 or 32. The drive of the horizontal brush 25, in a vertical direction, takes place as can be seen from the drawing, by means of a lifting cylinder 35 for actuating the lazy tongs and arranged in the upper region of the installation.

A parallelogrammatic guide-rod assembly 6a may also be used for a spraying device 37 instead of for a brush, as shown in FIG. 10.

In the embodiment shown in FIG. 10 the spraying device 37 consists of pipe sections 38, 39, 40 and 41 forming an endless ring. This pipe ring is mounted on a frame 17 which is held by the parallelogrammatic guide-rod assembly 6a and fed with water or other washing liquid by means of a pipe line connected thereto and not shown in detail in the drawing. The pipe 38 is provided with a number of nozzles 36 directed towards the vehicle and through which the washing liquid is emitted.

Several rollers 42 are mounted on the pipe 38 so as to be rotatable about the pipe axis which, when the spraying device is moved in the direction of the vehicle, are supported against the surface of the vehicle and so act as spacers between the nozzles 36 and the contoured surface of the vehicle.

The spraying device 37, provided with rollers, is urged by means of the parallelogrammatic guide-rod assembly 6a against the vehicle surface and is supported thereagainst under the influence of its dead weight. Owing to the relative movement between vehicle and washing installation the vehicle outlines are "traced" or followed in this manner, the rollers 42 ensuring that the nozzles 36 are constantly equidistantly disposed closely over the vehicle surface. This step permits a constantly uniform spraying effect to be achieved; in known installations the spacing between the nozzles and the vehicle surface varies considerably owing to the vehicle outlines. The spraying device 37 is pivotally mounted at 40 on the frame 17.

The rollers 42 are conveniently provided with a soft lining 43 (FIG. 11) on the circumference to prevent the vehicle surface being scraped or scratched.

The mounting 8 and drive 13 of the parallelogrammatic guide-rod assembly 6, i.e. the bearing carriage (e.g. in the form of a bogie) and the pneumatic cylinder 13, are displaceable longitudinally along the traverse 9, i.e. at right angles to the movement of the vehicle relative to the washing installation as represented by arrow 50 and the drive means 51. The whole arrangement may also be displaced additionally in the direction of the axis 16.

All the motors controlling the movements of the apparatus are of course remotely controlled by an operator.

I claim:

1. In vehicle-washing apparatus having a runway extending longitudinally of a vehicle to be washed and a carriage shiftable along said runway relatively to the vehicle, the improvement which comprises:

washing means rotatable about an axis and engageable with a surface of the vehicle for following the countours thereof and subjecting said surface to a washing treatment; and a parallelogrammatic linkage swingably mounted on said carriage and carrying said washing means with at least limited freedom of movement thereof in a direction transverse to said axis while maintaining said axis substantially parallel to itself during said movement of said washing means.

2. The improvement defined in claim 1, further comprising:

a generally U-shaped yoke mounted upon said parallelogrammatic linkage and open in the direction of said vehicle while rotatably supporting said washing means between the arms of said yoke; and means acting upon said parallelogrammatic linkage biasing said yoke in the direction of said surface to hold said washing means thereagainst.

3. The improvement defined in claim 2 wherein said washing means is a brush, further comprising:

drive means mounted upon said yoke for rotating said brush; and a counterweight on said parallelogrammatic linkage for balancing the weight of said brush.

4. The improvement defined in claim 2 wherein the last-mentioned means includes:

pusher means acting upon said parallelogrammatic linkage and actuable to urge said washing means against said surface.

5. The improvement defined in claim 1 wherein said washing means includes an array of liquid-spray nozzles extending parallel to said axis, and a plurality of spacer rollers engageable with said surface and spaced apart along said array for holding said nozzles a predetermined distance away from said surface.

6. The improvement defined in claim 1 wherein said parallelogrammatic linkage has at least one pivoting axis about which said washing means is swingable, further comprising:

bearing means supporting said parallelogrammatic linkage for swinging movement relative to said carriage about a further axis generally transverse to said pivoting axis of said parallelogrammatic linkage.

7. The improvement defined in claim 1 wherein said parallelogrammatic linkage is formed by a lazy tongs supporting said washing means upon said carriage.

References Cited by the Examiner
UNITED STATES PATENTS 2,865,034    12/1958    Petite _____ 15—53
3,208,088    9/1965    Sulzberger et al.

CHARLES A. WILLMUTH, *Primary Examiner.*

E. L. ROBERTS, *Assistant Examiner.*